July 26, 1960
T. WHEATLEY
2,946,479
CLOSURE ASSEMBLY
Filed Feb. 17, 1958
2 Sheets-Sheet 1
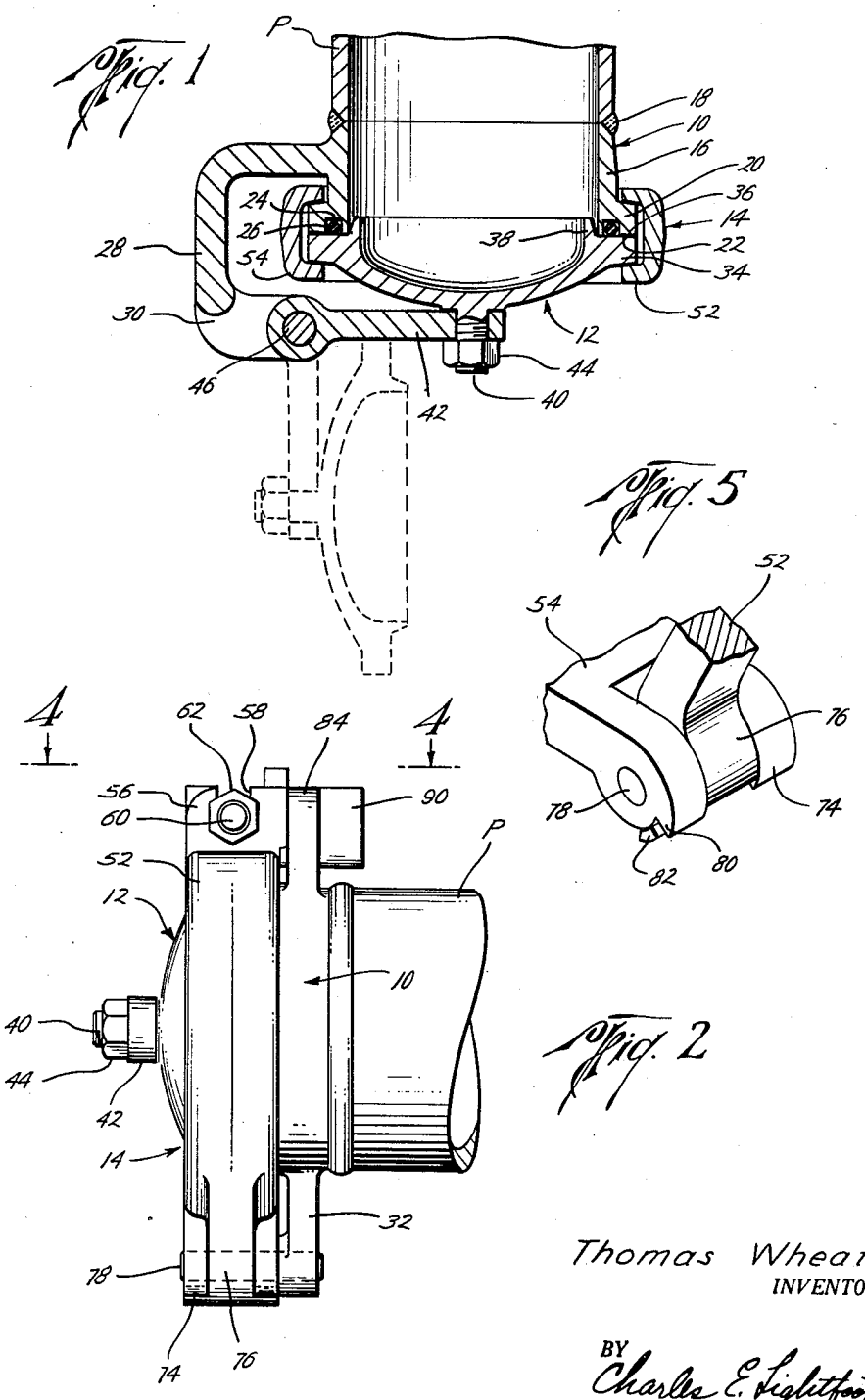
Thomas Wheatley
INVENTOR.
BY Charles E. Lightfoot
ATTORNEY July 26, 1960
T. WHEATLEY
2,946,479
CLOSURE ASSEMBLY
Filed Feb. 17, 1958
2 Sheets-Sheet 2
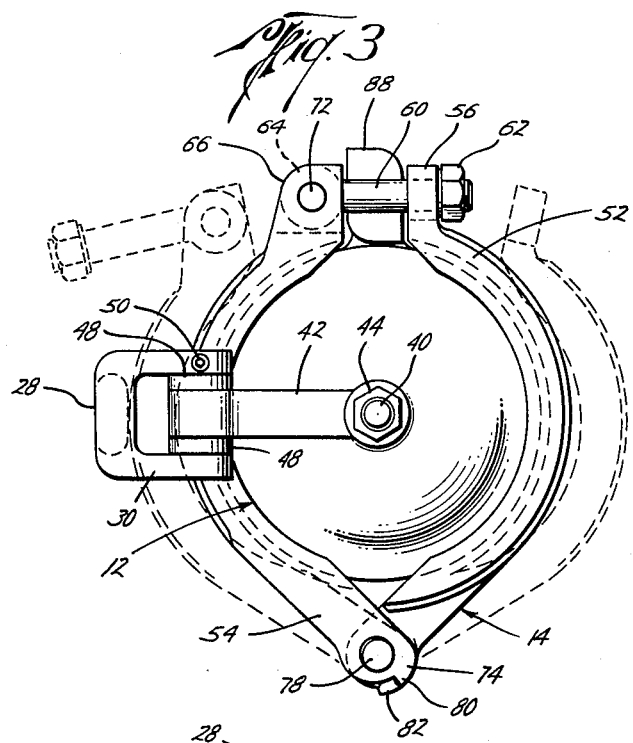
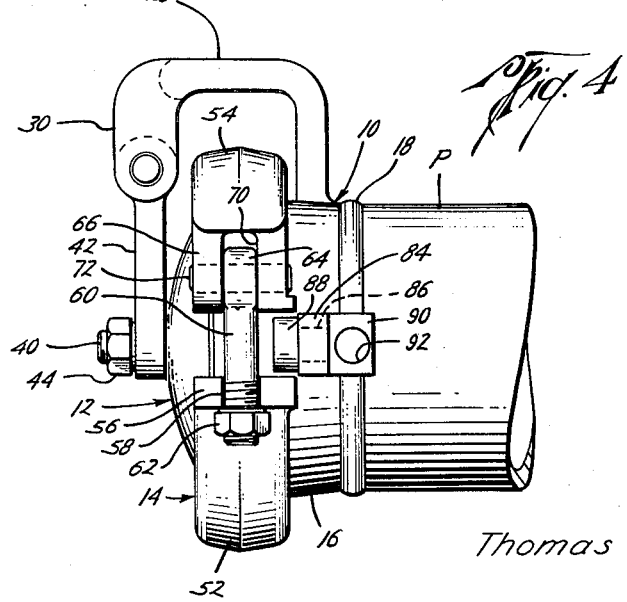
Thomas Wheatley
INVENTOR.
BY Charles E. Lightfoot
ATTORNEY United States Patent Office 2,946,479
Patented July 26, 1960

2,946,479

CLOSURE ASSEMBLY

Thomas Wheatley, 3505 W. Dallas St., Houston, Tex.

Filed Feb. 17, 1958, Ser. No. 715,743

1 Claim. (Cl. 220—55)

This invention relates to a closure assembly for conduits and the like, and more particularly to a closure assembly of the type commonly known as a blanking plug and which is adapted to be attached to the end of a pipe or conduit, or to a receptacle or vessel for closing an opening therein.

The invention finds particular application in connection with pipe systems such as those employed in oil field and refinery operations wherein it is often necessary to provide pipe ends having removable closures through which access may be had to the interior of pipes and vessels of various kinds for the purpose of cleaning the same or for the performance of other operations in such systems.

As heretofore commonly constructed blanking plugs have been secured in place by connections of the bolted flange type or by other means which are difficult and time consuming to remove and replace, and in which no means is usually provided for supporting the closure in a convenient position for opening and closing the same.

The present invention has for an important object the provision of a closure or blanking plug assembly embodying a flanged fitting adapted to be attached to a pipe end or the like, and a closure having a flange positioned to fit the flange of the fitting, said assembly also including means for applying a uniform closing force to the flanges throughout substantially the entire contracting areas of the flanges.

Another object of the invention is to provide a blanking plug assembly of the character mentioned having means for clamping together the flanges of the fitting and closure and which is easily removed and replaced for the purpose of opening and closing the assembly.

A further object of the invention is the provision in a blanking plug assembly of the kind referred to wherein the clamping means for holding the closure in closing position on the fitting is formed in two parts hingedly secured together and includes means for tightening the clamping means on the flanges and for releasing the clamping means therefrom to facilitate the opening and closing of the assembly.

Another object of the invention is to provide a blanking plug assembly of the kind referred to having means for supporting the closure and clamping means on the fitting in assembled relation whereby the parts are held together when the device is opened, in condition to be quickly and easily reassembled with the flanges in closing the assembly.

A still further object of the invention is the provision of a blanking plug assembly of simple design and rugged construction capable of withstanding the extreme conditions of hard usage and exposure to which devices of this kind are customarily subjected.

The above and other important objects and advantages of the invention may best be understood from the following detailed description, constituting a specification of the same, when considered in conjunction with the annexed drawings, wherein—

Figure 1 is a central, longitudinal, cross-sectional view illustrating a preferred embodiment of the invention and showing the same applied to a pipe end;

Figure 2 is a side elevational view of the embodiment of the invention illustrated in Figure 1;

Figure 3 is a front end elevational view of the same;

Figure 4 is a top plan view of the same; and

Figure 5 is a detail view on a somewhat enlarged scale showing the hinged connection of the sections of the clamping structure of the invention.

Referring now to the drawings in greater detail the invention is disclosed herein, by way of example, in connection with its application to the end of a pipe or conduit, such as that indicated at P which is to be closed or "blanked off" but which it is desired to open at times for the purpose of cleaning out the conduit or for other reasons. The invention comprises a flanged fitting, generally designated 10, commonly called an "adapter flange," upon which a flanged closure member 12 is pivotally supported in position to be moved into and out of closing relation to the fitting, and releaseable clamping means, generally indicated at 14, made in two parts, also supported on the fitting and constructed to be releasably engaged with the flanges of the fitting and closure to hold the closure in closed condition.

The fitting 10 has an annular body portion 16 adapted to be secured to the end of the pipe P, as by means of welding, as indicated at 18, or otherwise, and is formed with an external, annular end flange 20, having an end face 22 which may be provided with an annular groove 24 for the reception of suitable sealing means, such as an O-ring or the like. The fitting 10 is also formed with a side arm 28 whose free end extends forwardly beyond the end flange 20 and is formed with a U-shaped end portion or yoke 30, positioned to support the closure 12 in position to be swung into and out of closing relation to the fitting. A downwardly extending perforated lug 32 is provided on the fitting 10, upon which the two parts of the clamp 14 are pivotally carried.

The closure 12, in the present illustration, is of circular configuration, somewhat dished, and formed with an external annular flange 34 having an annular face 36 positioned for engagement with the face 22 of the flange 20 to form a fluid tight seal with the sealing element 26 when the closure is in closed position. Inwardly of the flange 34, the closure may be formed with an annular, tapered flange 38 extending away from the face 36 and positioned to enter the fitting to guide and centralize the closure on the fitting when the closure is closed. The closure also has a central, external lug or stud 40 which is threaded and which extends through a perforation in one end of a link 42 by which the closure is pivotally supported on the yoke 30 of the side arm 28. Suitable means, such as the nut 44 is threaded on the stud 40 to retain the closure attached to the link 42. At its other end the link 42 is also perforated to receive a pivot pin 46 extending therethrough which also extends into aligned perforations in the arms of the yoke 30, whereby the link is supported for horizontal swinging movement with the closure 12. Suitable spacer elements, such as those shown at 48, 48 may be provided on the pin 46 and the pin may be held against displacement in the yoke by means of a set screw 50 or the like.

The clamp 14 is formed in two parts 52 and 54 of arcuate shape and of channel shape in cross-section, as seen in Figure 1, to fit over the flanges 20 and 34 to clamp the closure in closed position on the fitting. At its upper end the clamp element 52 has an extension 56 provided with an upwardly opening end slot 58 positioned to receive a bolt 60 provided with a nut 62. The bolt 60 has an eye by which the bolt is pivotally secured to an extension 66 at the upper end of the clamp element 54 within an end slot 70 therein, as by means of a pivot pin 72.

At its lower end the clamp element 54 is formed with spaced apart perforated arms 74, 74 between which a perforated extension 76 extends, whereby the clamping elements are pivotally secured together, as by means of a pin 78 which also extends through a perforation in the downwardly extending lug 32 whereby the clamp elements are secured to the fitting 10. The arms 74, 74 and the extension 76 are formed with stop shoulder portions 80 and 82, respectively, as best seen in Figure 5, positioned for engagement to limit relative swinging movement of the clamping elements away from each other, whereby the elements are retained in position, as shown in dotted lines in Figure 1, to be readily closed about the flanges 20 and 34.

An upwardly extending perforated lug 84 is formed on the fitting 10, through which a shaft 86 is rotatably extended, which shaft carries a cam element 88 positioned between the upper end extensions 56 and 66 of the clamp elements 52 and 54, and has at its outer end a squared head 90 provided with a perforation 92. As best seen in Figure 3, the cam 88 has curved faces positioned to engage the extensions 56 and 66 to force the clamping elements 52 and 54 apart by rotation of the squared head 90 in the event that the clamping elements become stuck or frozen in clamping position on the flanges 20 and 34.

The flanges 20 and 34 are tapered radially outwardly and the channels of the clamp elements have side walls which converge toward each other outwardly so that the flanges are drawn into tight engagement when the clamp elements are in clamping position.

In the operation of the invention, constructed and arranged as described above, the closure 12 is swung to closing position with the face 36 in sealing engagement with the O-ring 26 and the clamping elements 52 and 54 are moved to clamping position over the flanges 20 and 34 whereupon the bolt 60 is engaged in the slot 58 of extension 56 and the nut 62 is tightened to securely clamp the closure on the fitting.

When it is desired to open the closure the nut 62 is loosened to permit bolt 60 to be swung upwardly out of the slot 58 so that the clamping elements 52 and 54 may swing outwardly about the pin 78 to releasing position to release the flanges 20 and 34. The closure is then swung open about the pin 46 on the link 42, as shown in dotted lines in Figure 1. In this condition of the device the closure and the clamping elements are supported on the fitting in convenient positions to be quickly and easily closed and reclamped without the necessity of replacing or relocating any loose parts.

In the event that the clamping elements should become stuck or frozen in clamping position, the cam 88 may be operated by rotation of the head 90 to free the clamping elements.

It will thus be seen that the invention provides a closure assembly or blanking plug of simple design and rugged construction which is easily opened or closed and wherein all of the parts remain in assembled condition at all times during the use of the assembly.

The invention has been disclosed herein in connection with a certain specific embodiment of the same, but it will be understood that this is intended by way of illustration only, and that various changes can be made in the construction and arrangement of the parts without departing from the spirit of the invention or the scope of the appended claim.

Having thus clearly shown and described the invention, what is claimed as new and desired to secure by Letters Patent is—

A closure assembly comprising, a tubular body having an external annular flange forming an annular end face on the body, a closure having an external annular flange forming an annular face positioned to be engaged with with said end face to close the body, means for supporting the closure on the body for movement into and out of a position to close the body, clamp elements having portions of channel-shape in cross section shaped to be positioned about the body and closure, means forming a pivotal connection between the body and each of said elements to support the elements for swinging movement into and out of a position to clampingly engage the flanges in said portions to hold the closure closed, cam means rotatably mounted on the body and having a portion extending between the ends of the clamp elements and formed with cam surfaces positioned for co-action with the ends of said elements to move the elements out of clamping position upon rotation of the cam means to one position and to permit the elements to be moved into clamping position upon rotation of the cam means to another position, and means for releasably holding the elements in clamped position.

References Cited in the file of this patent

UNITED STATES PATENTS

| | | |
|---|---|---|
| 1,958,923 | Mohler | May 15, 1934 |
| 2,310,901 | Van Horn | Feb. 9, 1943 |